United States Patent [19]

Weaver

[11] 3,869,495

[45] Mar. 4, 1975

[54] N-BENZYL-(2,2-DICYANOVINYL) ANILINES

[75] Inventor: Max A. Weaver, Kingsport, Tenn.

[73] Assignee: Eastman Kodak Company, Rochester, N.Y.

[22] Filed: Mar. 23, 1972

[21] Appl. No.: 237,529

[52] U.S. Cl............ 260/465 D, 8/179, 260/383 CN, 260/287 R, 260/465 E
[51] Int. Cl............................................ C07c 121/78
[58] Field of Search..................... 260/465 E, 465 D

[56] References Cited
UNITED STATES PATENTS

| | | | |
|---|---|---|---|
| 1,950,421 | 3/1934 | Wahl................................ | 260/465 |
| 2,206,108 | 7/1940 | Muller.............................. | 260/465 |
| 3,652,636 | 3/1972 | Scheuermann et al............ | 260/465 |
| 3,728,374 | 3/1973 | Fisher et al....................... | 260/465 |

*Primary Examiner*—Lewis Gotts
*Assistant Examiner*—Dolph H. Torrence

[57] ABSTRACT

N-Benzyl-p-(2,2-dicyanovinyl)aniline and N-benzyl-6-(2,2-dicyanovinyl)-1,2,3,4-tetrahydroquinoline compounds impart bright, fast, greenish-yellow shades to polyester fibers.

4 Claims, No Drawings

N-BENZYL-(2,2-DICYANOVINYL) ANILINES

This invention concerns a group of novel methine compounds which are useful for dyeing polyester materials such as carpet and textile fibers and includes such fibers so dyed.

The novel methine compounds of the invention conform to the formulas

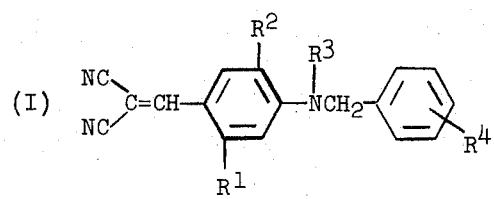

and

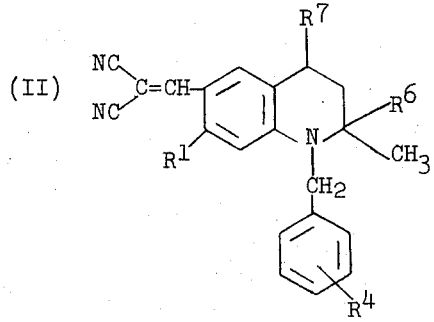

wherein $R^1$ and $R^2$ each is hydrogen, lower alkyl, lower alkoxy or halogen;

$R^3$ is cyclohexyl, cyclohexylmethyl, phenyl, lower alkoxyphenyl, halophenyl, a group having the formula

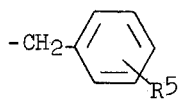

in which $R^5$ is hydrogen or a substituent which $R^4$ can represent or, when $R^4$ is lower alkoxycarbonyl, $R^3$ also can be lower alkyl, phenethyl, or lower alkyl substituted with cyano, halogen, cyclohexyl or lower alkanoyloxy;

$R^4$ is hydrogen, lower alkyl, lower alkoxy, halogen, lower alkoxycarbonyl, cyano, nitro, lower alkylsulfonyl, phenoxy or benzyloxy;

$R^6$ and $R^7$ each is hydrogen or methyl.

The novel methine compounds produce bright greenish-yellow shades on polyester fibers when applied thereto according to conventional disperse dyeing procedures. The compounds exhibit excellent fastness properties such as fastness to light and resistance to sublimation. The compounds also exhibit good dyeability and pH stability. Another advantage possessed by my novel compounds is their economy which, when coupled with their properties, renders them advantageous when compared to known methine compounds.

The novel compounds are prepared according to procedures well known in the art. For example, an unsubstituted or substituted aniline compound can be reacted with an unsubstituted or substituted benzaldehyde to yield an anil which then can be hydrogenated to obtain an N-benzylaniline having the formula

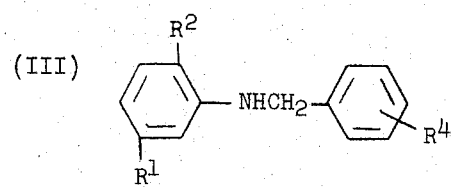

which then can be alkylated or benzylated to obtain a compound having the structure

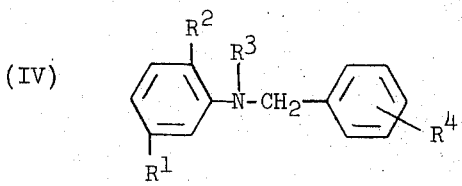

The compounds of formula (IV) also can be obtained by benzylating an aniline or N-substituted aniline compound.

The compounds of formula (IV) can be formylated by treating them with dimethylformamide and $POCl_3$ to obtain an intermediate having the formula

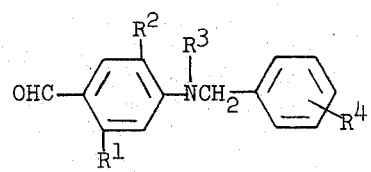

which then is condensed with malononitrile in the presence of a basic catalyst to yield the compounds of formula (I). The compounds of formula (II) are prepared by techniques analogous to those described above.

The substituents represented by $R^1$ through $R^5$ are well known and can be derived from readily-available intermediates. As used herein to describe a substituent containing an alkyl moiety, "lower" designates a carbon content of from one to about four carbon atoms. For example, the alkoxycarbonyl groups represented by $R^4$ and $R^5$ can be methoxycarbonyl, ethoxycarbonyl, propoxycarbonyl, butoxycarbonyl, isobutoxycarbonyl, etc. Chlorine and bromine are typical halogen atoms which can be present on my novel methine compounds. Preferred substituents represented by $R^1$ through $R^7$ are as follows: $R^1$ and $R^2$ each is hydrogen, methyl or methoxy; $R^3$ is benzyl or benzyl substituted with methyl, methoxy or chlorine; $R^4$ is methyl, methoxy, chlorine or methoxycarbonyl; and $R^6$ and $R^7$ each is hydrogen or methyl.

A group of the novel compounds which are especially valuable dyes for polyester fibers because of their cost:performance ratio have the formula

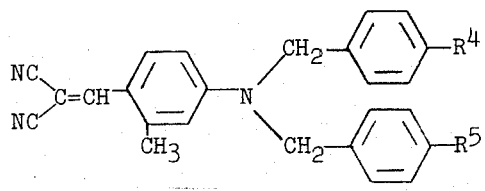

in which $R^4$ is hydrogen, methyl, methoxy, chlorine or methoxycarbonyl and $R^5$ is hydrogen, methyl, methoxy or chlorine.

The novel methine compounds and their preparation are further illustrated by the following examples.

EXAMPLE 1

To 14.3 g. of N,N-dibenzyl-m-toluidine in 20 ml. of dimethylformamide is added at about 25°C. 5 ml. of phosphorous oxychloride and the mixture is heated at 95°–100°C. for 30 minutes. The reaction mixture then is drowned into 300 ml. water and after standing overnight the product is collected by filtration, washed with water and dried in air. The yield of p-formyl-N,N-dibenzyl-m-toluidine is 14.5 g. A mixture of 3.15 g. of the aldehyde, 0.66 g. malononitrile, 25 ml. ethanol and 5 drops of piperidine is refluxed for 1 hour. Upon cooling the product crystallizes and is collected by filtration and dried in air. The yield of the methine product having a melting point of 155°–156°C. is 3 g.

EXAMPLE 2

To a solution of 3.38 g. of N-(p-methoxycarbonylbenzyl)-2,2,4,7-tetramethyl-1,2,3,4-tetrahydroquinoline in 10 ml. dimethylformamide is added dropwise 2 ml. of phosphorous oxychloride at 10°–15°C. The mixture is heated for 2 hours on a steam bath and then is drowned into 500 ml. of an ice-water mixture. The mixture is neutralized with 50% sodium hydroxide and the product collected by filtration, washed with water and air dried. After recrystallization from 50 ml. methanol the yield of 6-formyl-N-(p-methoxycarbonylbenzyl)-2,2,4,7-tetramethyl-1,2,3,4-tetrahydroquinoline having a melting point of 134°–136°C. was 2.2 g. The corresponding methine compound is obtained by reacting 0.9 g. of aldehyde with 0.2 g. malononitrile and isolating the product according to the procedure described in Example 1.

The methine compounds described in Tables 1 and 2 conform to formulas (I) and (II), respectively, are prepared by the procedures described hereinabove, and produce bright, fast, greenish-yellow shades on polyester fibers. Examples 1 and 2 of the Tables designate the structures of the methine compounds synthesized according to the preceding examples. The numbering for the positions of $R^1$ and $R^2$ in Table 1 is with reference to the point of attachment of the nitrogen atom to which $R^3$ is attached.

Table 1

| Example Number | $R^1, R^2$ | $R^3$ | $R^4$ |
|---|---|---|---|
| 1 | 3-$CH_3$ | $-CH_2C_6H_5$ | H |
| 3 | H | $-CH_2C_6H_5$ | H |
| 4 | 2,5—di—$OCH_3$ | $-CH_2C_6H_5$ | H |
| 5 | 5—$OCH_3$—2—$CH_3$ | $-CH_2C_6H_5$ | H |
| 6 | 2—$OCH_3$—5—$CH_3$ | $-CH_2C_6H_5$ | H |
| 7 | 3—$OCH_3$ | $-CH_2C_6H_5$ | H |
| 8 | 3—$CH_3$ | $-CH_2C_6H_5$ | p—$CH_3$ |
| 9 | 3—$CH_3$ | $-CH_2C_6H_5$ | p—$OCH_3$ |
| 10 | 3—$CH_3$ | $-CH_2C_6H_5$ | m—Cl |
| 11 | 3—$CH_3$ | $-CH_2C_6H_5$ | o,p—di—Cl |
| 12 | 3—$CH_3$ | $-CH_2C_6H_4$-p-$CH_3$ | p—$CH_3$ |
| 13 | 3—$CH_3$ | $-CH_2C_6H_5$ | p— $OC_6H_5$ |
| 14 | 3—$CH_3$ | $-CH_2C_6H_5$ | p—$OCH_2C_6H_5$ |
| 15 | 3—$CH_3$ | $-CH_2C_6H_5$ | p—$COOCH_3$ |
| 16 | 3—$CH_3$ | $-C_2H_5$ | p—$COOCH_3$ |

Table 1-Continued

| Example Number | $R^1, R^2$ | $R^3$ | $R^4$ |
|---|---|---|---|
| 17 | 3—$CH_3$ | $-CH_2CH_2Cl$ | p—$COOCH_3$ |
| 18 | 3—$CH_3$ | $-CH_2CH_2CN$ | p—$COOCH_3$ |
| 19 | 3—$CH_3$ | $-C_6H_{11}$ | H |
| 20 | H | $-C_6H_5$ | H |
| 21 | H | $-CH_2CH_2CN$ | p—$COOCH_3$ |
| 22 | 3—$CH_3$ | $-CH_2CH_2C_6H_5$ | p—$COOCH_3$ |
| 23 | 3—$CH_3$ | $-CH_2C_6H_{11}$ | p—$COOCH_3$ |
| 24 | 3—$CH_3$ | $-C_6H_4$—p—$COOCH_3$ | p—$COOCH_3$ |
| 25 | 3—$CH_3$ | $-CH_2C_6H_5$ | o—Cl |

Table 2

| Example Number | $R^1$ | $R^4$ | $R^6$ | $R^7$ |
|---|---|---|---|---|
| 2 | $CH_3$ | p—$COOCH_3$ | $-CH_3$ | $-CH_3$ |
| 26 | $CH_3$ | H | $-CH_3$ | $-CH_3$ |
| 27 | $CH_3$ | p—$CH_3$ | $-CH_3$ | $-CH_3$ |
| 28 | $CH_3$ | m—$CH_3$ | $-CH_3$ | $-CH_3$ |
| 29 | $CH_3$ | o—Cl | $-CH_3$ | $-CH_3$ |
| 30 | $CH_3$ | m—Cl | $-CH_3$ | $-CH_3$ |
| 31 | $CH_3$ | p—Cl | $-CH_3$ | $-CH_3$ |
| 32 | $CH_3$ | o,p—di—Cl | $-CH_3$ | $-CH_3$ |
| 33 | $CH_3$ | p—$OCH_2C_6H_5$ | $-CH_3$ | $-CH_3$ |
| 34 | $CH_3$ | p—$COOCH(CH_3)_2$ | $-CH_3$ | $-CH_3$ |
| 35 | $CH_3$ | p—$COOC_2H_5$ | $-CH_3$ | $-CH_3$ |
| 36 | $CH_3$ | p—CN | $-CH_3$ | $-CH_3$ |
| 37 | $CH_3$ | p—$NO_2$ | $-CH_3$ | $-CH_3$ |
| 38 | $CH_3$ | p—$SO_2CH_3$ | $-CH_3$ | $-CH_3$ |
| 39 | $CH_3$ | p—$COOCH_3$ | $-CH_3$ | $-CH_3$ |
| 40 | H | p—$COOCH_3$ | $-CH_3$ | $-CH_3$ |
| 41 | $-OCH_3$ | p—$COOCH_3$ | $-CH_3$ | $-CH_3$ |
| 42 | $-Cl$ | p—$COOCH_3$ | $-CH_3$ | $-CH_3$ |
| 43 | $-CH_3$ | p—$COOCH_3$ | H | H |
| 44 | H | p—$COOCH_3$ | H | H |
| 45 | H | p—$COOCH_3$ | H | H |

The compounds of the invention can be applied to polyester textile and carpet fibers by known disperse dyeing techniques employing carriers, surfactants, dispersing agents, etc. Dyeing can be conducted at atmospheric or super-atmospheric pressures. The following example illustrates a carrier dyeing procedure for applying the methine compounds of the invention to polyester textile materials.

EXAMPLE 46

The methine compound of Example 1 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Carolid, o-phenylphenol) is added to the bath and 10 g. of a textile fabric made of poly(ethylene terephthalate) fibers is placed in the bath and worked 10 minutes without heat. The dyeing is carried out at the boil for 1 hour. The dyed fabric is removed from the dyebath and scoured for 20 minutes at 80°C. in a solution containing 1 g./l. neutral soap and 1 g./l. sodium carbonate. The fabric is then rinsed, dried in an oven at 250°F. and heat set (for removal of residual carrier) for 5 minutes at 350°C.

The following example describes the application of my novel methine at super-atmospheric pressure to texturized polyester fibers:

EXAMPLE 47

The methine compound of Example 4 (33.3 mg.) is dissolved in about 10 cc. of 2-methoxyethanol. A small amount (approximately 3–5 cc.) of a 3% sodium lignin sulfonate solution, 2 cc. of a 5% solution of monobasic sodium phosphate, 10 cc. of a 1% solution of Calgon, 0.5 cc. of a 5% acetic acid solution and about 0.3 cc. of a butyl benzoate emulsion (DAC 888) are added with stirring to the bath which then is brought to a total volume of 300 cc. with water. The bath is made up in a 1-quart stainless steel pressure container (a standard Launder-Ometer container). 10 Grams of a double knit fabric made from texturized poly(ethylene terephthalate) polyester fibers are placed in the bath and the pressure container is sealed and attached to the rotating shaft of the Launder-Ometer which is put in motion. The glycerin heating medium in the Launder-Ometer raises the temperature of the bath to about 250°F. over about a 40-minute period and the dyeing is continued at 250°F. for 1.5 hours. After allowing the container to cool to about 200°F., the dyed fabric is removed from the bath, rinsed with water and dried in an oven at 250°F.

The compounds of the invention can also be applied to polyester textile materials by the heat-fixation technique described in U.S. Pat. No. 2,663,612 and in the American Dyestuff Reporter, 42, 1 (1953). The following procedure describes how the methine compounds of the invention can be applied to polyester materials by the heat-fixation technique.

EXAMPLE 48

A mixture of 500 mg. of the compound of Example 15, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough one-eighth inch stainless steel balls are added to provide maximum grinding. When the grinding is complete, the entire contents are poured into a beaker and 100 ml. of water are used to wash the remaining dye paste from the micro-container. The dye paste is then heated slowly to 65°C. with continuous stirring. A thickener and penetrating mixture is prepared by mixing 1 ml. of a complex diaryl sulfonate surfactant, (Compound 8-S), 3 ml. of a 3% solution of a sodium N-methyl-N-oleoyltaurate (Igepon T-S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45°–60°C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics. The padded fabrics are then dried at 200°F. and then heat-fixed for 2 minutes at 415°F. in a forced air oven. The dyed fabrics are scoured for 20 minutes at 65°–70°C. in a solution containing 0.2% sodium hydrosulfite, 0.2% sodium carbonate and 1.7% of a 3% solution of sodium N-methyl-N-oleoyltaurate and then dried. The fabrics possess excellent brightness and exhibit outstanding fastness to light and sublimation when tested according to the procedures described in the 1966 edition of the Technical Manual of the American Association of Textile Chemists and Colorists.

The heat-fixation dyeing procedure described above, can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of my invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. No. 2,901,446. Poly(ethylene terephthalate) polyester fibers are described, for example, in U.S. Pat. No. 2,465,319. The polymeric linear polyester materials disclosed in U.S. Pat. Nos. 2,945,010, 2,957,745 and 2,989,363, for example, can be dyed. The linear aromatic polyester materials specifically named have a melting point of at least 200°C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These intrinsic viscosities are measured at 25°C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in considerable detail with particular reference to preferred embodiments thereof, but it will be understood that variations and modifications can be effected within the spirit and scope of the invention.

I claim:

1. A compound having the formula

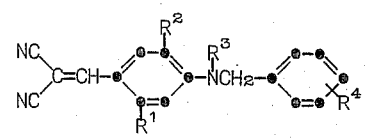

wherein

R$^1$ and R$^2$ are each selected from hydrogen and lower alkyl;

R$^3$ is cyclohexyl, benzyl, cyanoethyl, chloroethyl, or lower alkyl; [phenylethyl, phenyl, lower alkylphenyl, lower alkoxyphenyl, halophenyl, a group having the formula

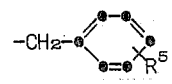

in which R⁵ is hydrogen or a substituent which R⁴ can represent, or, when R⁴ is lower alkoxycarbonyl, R³ also can be lower alkyl or lower alkyl substituted with cyano, halogen, cyclohexyl or lower alkanoyloxy;]

R⁴ is hydrogen, lower alkyl, lower alkoxy, halogen, or lower alkoxycarbonyl.

2. A compound according to claim 1 having the formula

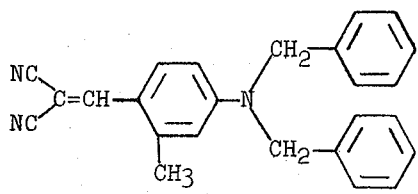

3. A compound according to claim 1 having the formula

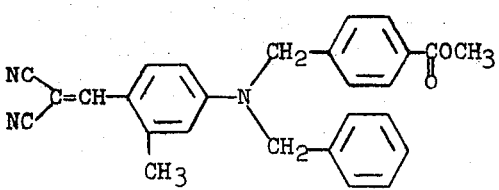

4. A compound according to claim 1 having the formula

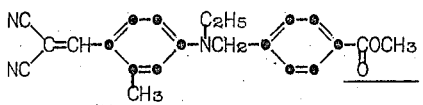

* * * * *

PO-1050
(5-69)

UNITED STATES PATENT OFFICE
CERTIFICATE OF CORRECTION

Patent No. 3,869,495           Dated March 4, 1975

Inventor(s) Max A. Weaver

It is certified that error appears in the above-identified patent and that said Letters Patent are hereby corrected as shown below:

Column 6, lines 60-67 and Column 7, lines 1-4, the bracketed information should be deleted.

Signed and Sealed this sixth Day of January 1976

[SEAL]

Attest:

RUTH C. MASON
*Attesting Officer*

C. MARSHALL DANN
*Commissioner of Patents and Trademarks*